Feb. 10, 1931.  E. C. FURMAN  1,791,810
FLUID TIGHT JOINT
Filed Aug. 11, 1927   3 Sheets-Sheet 1

Inventor
Eugene C. Furman,
By Cameron, Kirkham & Sutton
Attorneys

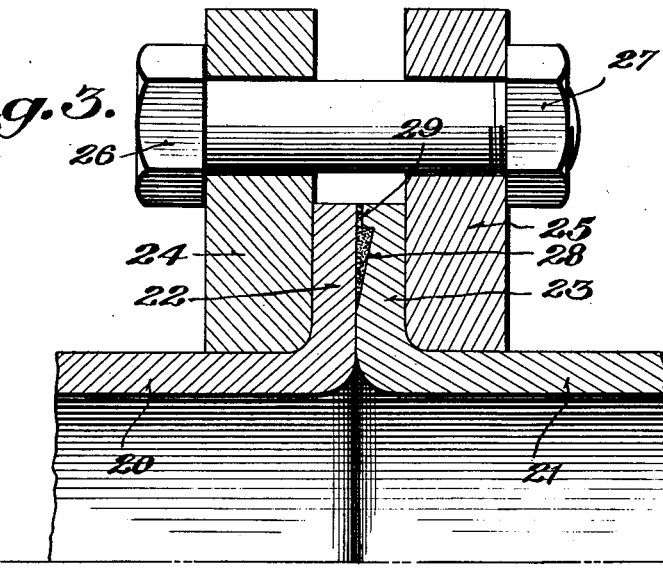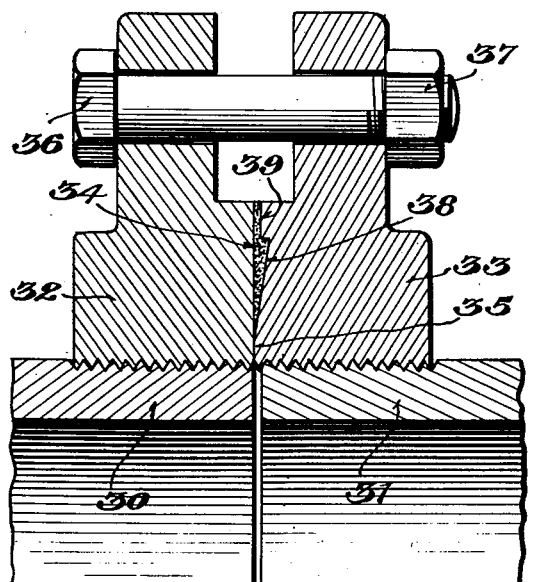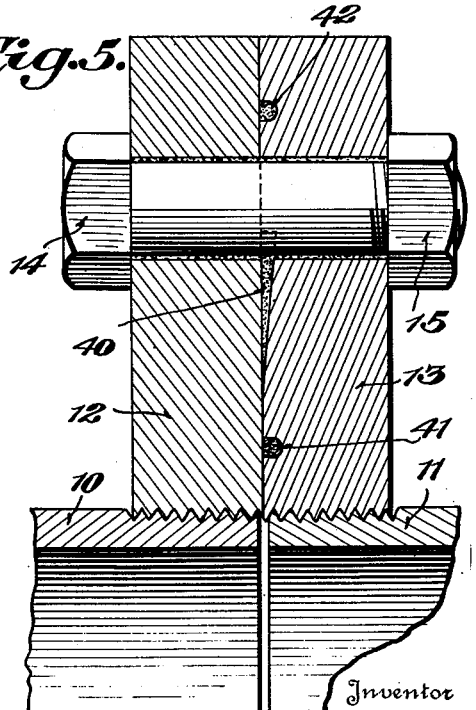

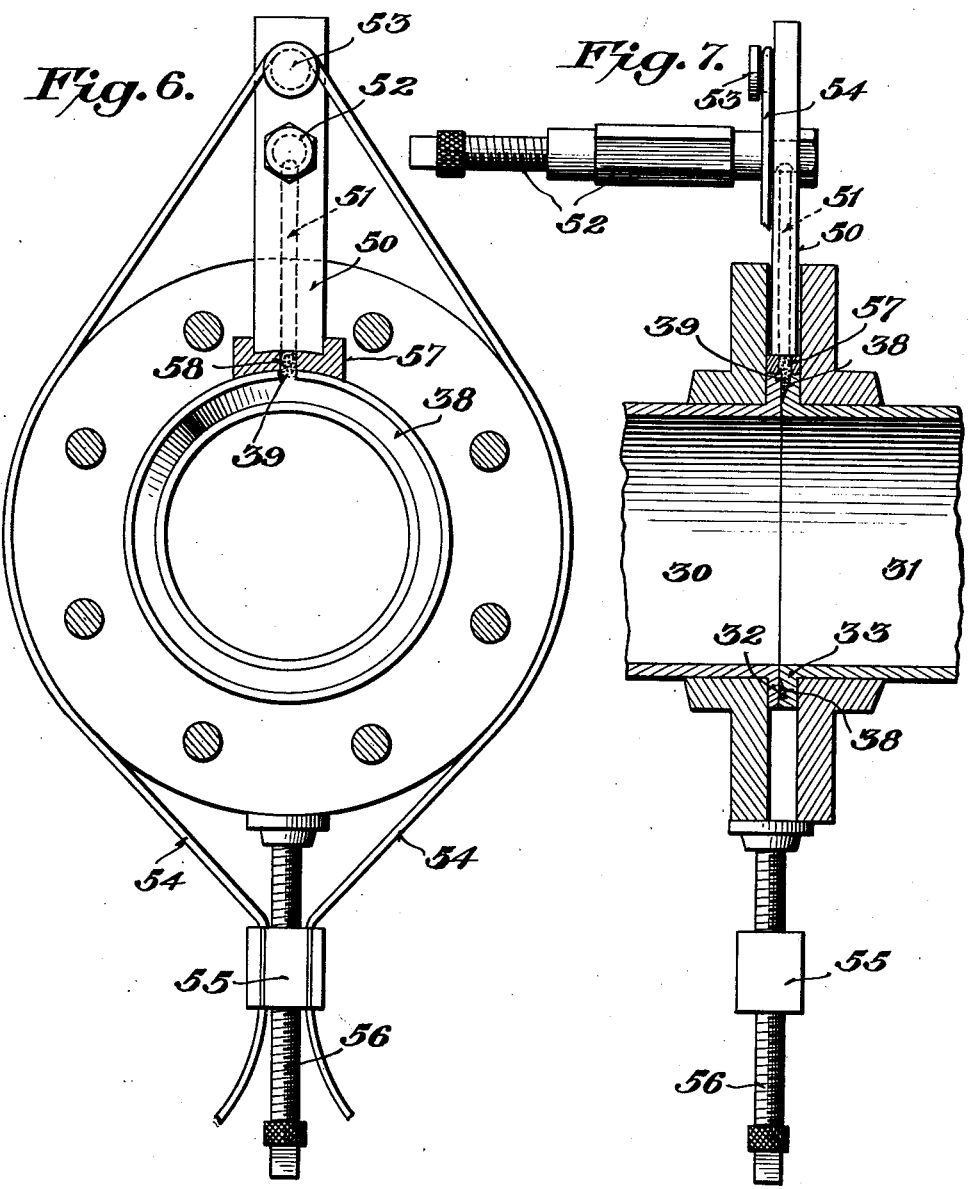

Patented Feb. 10, 1931

1,791,810

UNITED STATES PATENT OFFICE

EUGENE CLAY FURMAN, OF NEWPORT NEWS, VIRGINIA

FLUID-TIGHT JOINT

Application filed August 11, 1927. Serial No. 212,308.

This invention relates to fluid-tight joints and methods of making the same, and while it will be described by reference to pipe joints, it is to be expressly understood that the invention is not limited thereto, as it possesses marked advantages and utility when applied to bulkhead joints and other suitable types of joints.

It is an object of this invention to provide an improved fluid-tight joint and method of making the same, whereby the joint is highly efficient, utilizing a metal-to-metal contact and avoiding the usual packing gaskets with their tendency to become loose under the compression of long service, and whereby the joint is relatively simple in construction, easy to form and repair, and economical of material.

Another object of this invention is to provide an improved joint and method of making the same whereby the joint is adapted to withstand relatively high pressures without danger of leakage.

Another object of this invention is to provide an improved joint and method of making the same whereby escape of the sealing material from the joint may be prevented.

Other objects will appear as the description of the invention proceeds.

The joint of the present invention is capable of receiving a variety of mechanical expressions and the method of being carried out in a variety of ways. For purposes of illustration reference is made to the accompanying drawings in explaining the invention, but it is to be expressly understood that the drawings are for purposes of illustration only and are not to be construed as a definition of the limits of the invention, reference being had to the appended claims for that purpose.

Referring to the drawings wherein like reference characters designate corresponding parts in the several figures—

Fig. 3 is a fragmentary sectional view of another type of joint embodying the present invention;

Fig. 4 is a fragmentary sectional view of a raised face type of joint embodying the present invention;

Fig. 5 is a fragmentary sectional view of another embodiment of this invention; and Figs. 6 and 7 are face and side views of a suitable apparatus for sealing the joints of Figs. 3 and 4.

In accordance with the present invention, a fluid-tight joint is effected between joint elements preferably in metal-to-metal contact, by injecting a sealing medium which will harden, preferably vulcanize, into one or more wedge-shaped grooves formed in one or both of contacting surfaces of the joint, so as to form one or more feather edge gaskets with the feather edge directed toward the higher pressure.

Figure 1:
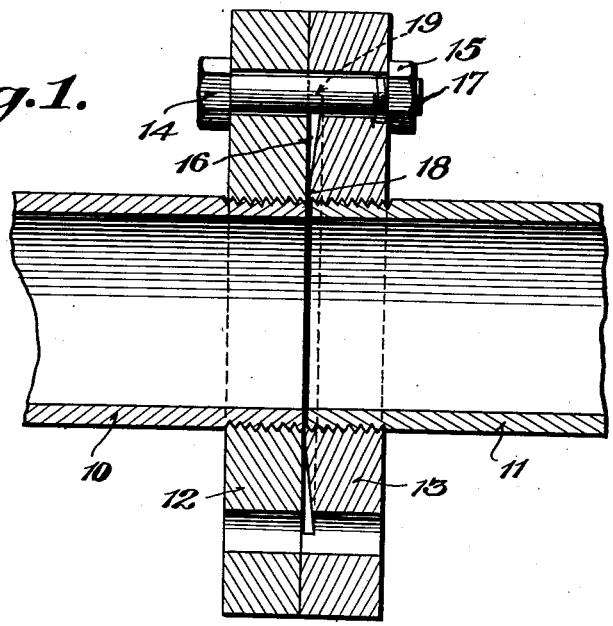
Fig. 1 is a sectional view of a common type of flanged joint embodying the present invention.
Figure 2:
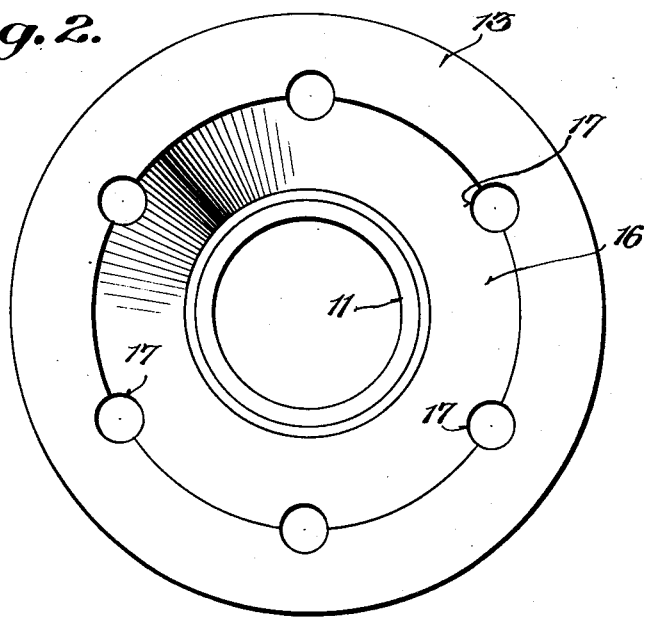
Fig. 2 is a face view of one of the flanges of Fig. 1.

In the form shown in Figs. 1 and 2, a pair of pipe sections 10 and 11 carry in any suitable way, as by threaded connections, flanges 12 and 13 which are retained in contact, preferably in metal-to-metal contact, in any suitable way, as by a plurality of bolts 14 and nuts 15.

In conformity with this invention one or both of said flanges are provided with a wedge-shaped groove 16 with its thin edge directed toward the higher pressure, which is here assumed to be within the pipe. Said groove 16 may be annular or of any other suitable configuration. Said groove may break into the bolt holes as shown at 17, or it may lie entirely within or without the bolt holes and be connected to one or more of the bolt holes by connecting grooves. Either a single groove may be employed or a plurality of coaxial grooves may be employed if desired, especially where the contacting surfaces are relatively large.

The joint is sealed, after the surfaces of the flanges have been brought into tight contact, by removing one of the nuts 15 or one of the bolts 14 and injecting around the bolt or through the bolt hole a suitable sealing medium which will flow into and fill the groove 16 and thereafter harden therein, preferably vulcanizing therein. Any suitable sealing medium such for example as those disclosed in my Patent No. 1,620,154, granted March 8, 1927, may be used, and any suitable apparatus for injecting such sealing medium around the bolt or into the bolt hole may be employed—such as disclosed, for example, in my aforesaid patent.

The sealing medium is permitted to harden or it is vulcanized in the groove 16 in any suitable way, and becomes a permanent gasket or seal between the flanges 12 and 13, and as the narrow or feather edge of the wedge-shaped gasket thus formed is directed toward the high pressure while its broad edge 19 is abutted against the deep edge of the groove 16, the gasket is capable of withstanding relatively high pressures without danger of being blown out or otherwise injured. The sealing medium may also fill or seal the clearances between some or all of the bolts and their holes, as desired.

In the form shown in Fig. 3, the pipe sections 20 and 21 have flanges 22 and 23 held in metal-to-metal contact by rings 24 and 25, and bolts 26 and nuts 27. The wedge-shaped groove or grooves 28 are here formed in one or both of the flanges 22 and 23 and communicate with the exterior of the joint through an inlet groove 29 for the injection of the sealing medium therethrough.

In the form shown in Fig. 4, the pipe sections 30 and 31 carry flanges 32 and 33 which have raised faces 34 and 35, and are secured together by bolts 36 and nuts 37, as in the usual raised-face type of joint. The wedge-shaped groove or grooves 38 are formed in one or both of said raised faces and communicate with the exterior of the joint through an inlet groove 39, as in the embodiment of Fig. 3.

In the form shown in Fig. 5, a flange joint of the type illustrated in Fig. 1 is provided with a wedge-shape groove 40 which breaks into or communicates with one or more of the bolt holes. In this embodiment means are provided to prevent the escape of the sealing medium either into the pipe or exteriorly of the flanges, or both. Grooves 41 and 42 are formed in one or both of the contacting surfaces of the flanges 12 and 13 radially inside and radially outside of the groove 40, and suitable packing, such as lead wire, is placed in these grooves so that when the flanges are tightened up by the bolts and nuts said lead wires will seal off the annular surface which contains the wedge-shaped groove 40. If desired, only one of these sealing rings 41 or 42 may be used if it is desired to assure against escape of the medium from groove 40 in only one direction.

Figs. 6 and 7 show a suitable apparatus for injecting the sealing medium into the wedge-shaped groove when the latter communicates with the exterior of the joint through an inlet groove as in the embodiments shown in Figs. 3 and 4. A gun plate 50 of suitable thickness has an interior passage 51 with which communicates a pressure gun 52. Plate 50 also carries a knob 53 for the engagement therewith of a cable 54 which extends to a nut 55 on a jack screw 56. A sealing block 57, provided with an aperture 58 and formed of a compressible or caulking material, such as lead, is preferably interposed between the plate 50 and the flanges of the joint, with its aperture in communication with the passage 51 in plate 50 and the inlet passage 39 leading to the wedge-shaped groove 38. The cable being placed around the joint and engaged with the knob 53, the plate 50 with its block 57 may be forced or caulked into sealing contact with the periphery of the flanges, after which the gun 52 may be manipulated to force the sealing medium into the groove 38.

It will be observed that the sealing medium may be injected into the joint while pressure is on the pipe as well as when off. Also in the event of leakage the wedge-shaped gasket can be renewed without taking the pressure off of the line, if desired.

It will therefore be perceived that a highly efficient fluid-tight joint and method of making the same have been provided, whereby metal-to-metal contact of the joint elements may be utilized and the usual packings eliminated. At the same time the joint is simple in character, easy to form and repair and economical of material. It is also capable of withstanding relatively high pressures.

It will also be perceived that a fluid-tight joint has been provided which has particular utility when applied to the formation of joints at bulkhead and other fluid-tight walls or partitions. In this service the flange at each side of the wall is grooved as heretofore described in connection with the embodiment of Fig. 1, for example, and the sealing medium is injected through a bolt hole in a flange at one side of the wall, as heretofore explained. By the exertion of pressure on the sealing medium it is caused to flow through the clearances between the bolts and the wall, filling not only the grooves in the flanges at both sides of the wall but all clearances between the bolts and flanges, and between the bolts and the wall, thereby eliminating the necessity for grommets and washers, and making a fluid-tight joint at the wall.

While the embodiments illustrated have been described with considerable particularity, it is to be expressly understood that the invention is not restricted thereto, as other embodiments will now suggest themselves to those skilled in the art, which changes may be made in details of construction, and proportion and arrangement of parts, and certain features used without other features, without departing from the spirit of this invention. Reference is therefore to be had to the appended claims for a definition of the limits of the invention.

What is claimed is:

1. The method of forming a fluid-tight joint between the contacting surfaces of joint elements which includes forming a wedge-shaped groove in at least one of said contacting surfaces, positioning said joint elements in contact, then injecting into said groove a vulcanizable sealing medium, and vulcanizing said sealing medium to form a feather-edged gasket between said surfaces.

2. The method of forming a fluid-tight joint between the contacting surfaces of joint elements which includes forming a wedge-shaped groove in at least one of said contacting surfaces, interposing a sealing ring between said contacting surfaces and between said groove and one or both of the inner and outer peripheries of said surfaces, injecting into said groove a sealing medium which will vulcanize, and vulcanizing the same in said groove.

3. The method of forming a fluid-tight joint between the contacting surfaces of flanged joint elements which includes forming one or more wedge-shaped grooves in the surfaces designed to contact, securing said joint elements together with the flange surfaces in metal-to-metal contact, then injecting into said groove or grooves a sealing medium and hardening said sealing medium in said grooves.

4. The method of forming a fluid-tight joint between the contacting surfaces of joint elements which includes forming one or more wedge-shaped grooves in the surfaces designed to contact, securing said joint elements together in metal-to-metal contact, then injecting a vulcanizable sealing medium into said groove or grooves, and vulcanizing the same therein.

5. The method of forming a fluid-tight joint between the contacting surfaces of flanged joint elements which includes forming one or more wedge-shaped grooves in the surfaces designed to contact, forming one or more grooves in radially spaced relation to said first-named grooves, securing packing material in said last-named grooves, securing said joint elements together with the flange surfaces in metal-to-metal contact, injecting into said first-named grove or grooves a sealing medium and hardening said sealing medium in said grooves.

6. The method of forming a fluid-tight joint between the contacting surfaces of joint elements which includes forming one or more wedge-shaped grooves in the surfaces designed to contact, forming one or more grooves in radially spaced relation to said first-named grooves, securing packing material in said last-named grooves, securing said joint elements together in metal-to-metal contact, injecting a vulcanizable sealing medium into said first-named groove or grooves, and vulcanizing the same therein.

7. The method of forming a fluid-tight joint between the contacting surfaces of flanged joint elements which includes forming in one or both of said surfaces one or more wedge-shaped grooves with the thin edge of the wedge directed toward the higher pressure, securing the flange surfaces of said joint elements together and then forming a gasket in said groove or grooves by injecting thereinto a sealing medium and hardening said medium therein.

8. The method of forming a fluid-tight joint between the contacting surfaces of joint elements which includes forming in one or both of said surfaces one or more wedge-shaped grooves with the thin edge of the wedge directed toward the higher pressure, securing the joint elements together and then forming a gasket in said groove or grooves by injecting a sealing medium and vulcanizing the same therein.

9. The method of forming a fluid-tight joint between the contacting surfaces of joint elements which includes forming in one or both of said surfaces one or more wedge-shaped grooves with the thin edge of wedge directed toward the higher pressure, securing the joint elements in contact with packing material between said groove or grooves and one or both of the inner and outer peripheries of said surfaces, injecting a vulcanizable sealing medium into said groove or grooves, and vulcanizing the same therein.

10. In a fluid-tight joint, the combination of joint elements in face-to-face contact, at least one of said elements having in its contacting face a groove which affords a relatively broad abutment at one peripheral extremity and decreases in depth toward its opposite peripheral extremity, said groove having its thin edge directed toward that periphery of said surfaces which is at the higher pressure, a correspondingly shaped gasket in said groove with its thin edge directed toward the higher pressure, and means holding said joint elements in face to face contact.

11. In a fluid-tight joint, the combination of joint elements, means holding said elements in face-to-face contact, at least one of said elements having in its contacting face a groove which is relatively shallow at the peripheral extremity that is at the higher pressure and which is relatively deep at the opposite peripheral extremity, a feather edge gasket in said groove, one or more grooves in said surfaces between said first-named groove and the periphery of said surfaces, and packing material in said last-named groove or grooves.

12. In a fluid-tight joint, the combination of a pair of flanges, means securing said flanges together in metal-to-metal contact, at least one of the contacting surfaces of said flanges having at least one wedge-shaped groove therein and a correspondingly shaped gasket formed in said groove, said gasket having a relatively broad peripheral base and decreasing in axial thickness toward its opposite peripheral extremity and said groove, affording a relatively broad abutment for said gasket base and shallowing toward its opposite peripheral extremity, said gasket having its thin edge directed toward that periphery of said surfaces which is at the higher pressure.

In testimony whereof I have signed this specification.

EUGENE CLAY FURMAN.